Sept. 8, 1942.　　　　P. E. WAUGH　　　　2,295,097
APPARATUS FOR REMOVING WATER FROM OIL-CIRCULATING SYSTEMS
OF INTERNAL COMBUSTION ENGINES
Filed April 5, 1939
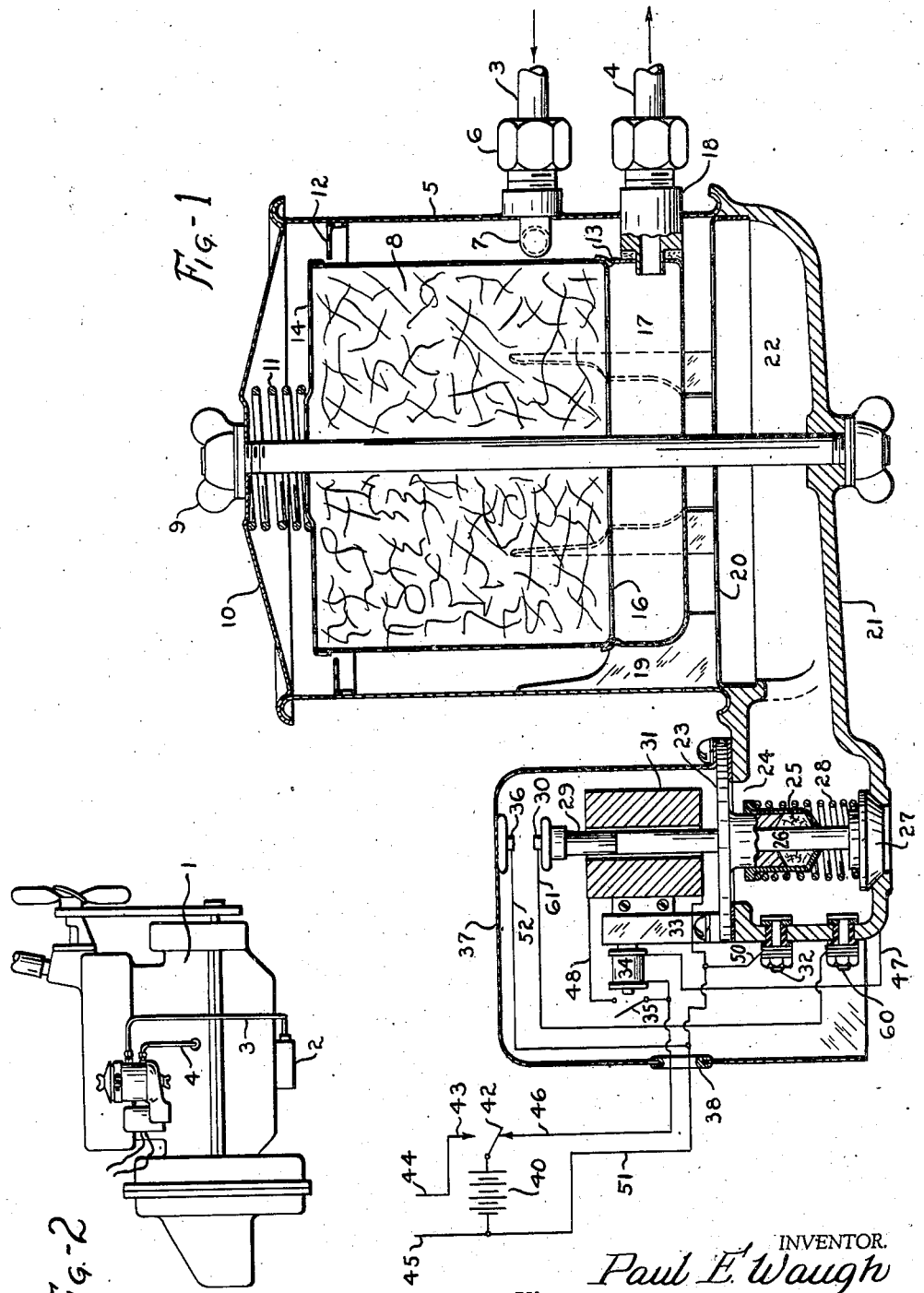
INVENTOR.
Paul E. Waugh
BY: Cox & Moore
ATTORNEYS.

Patented Sept. 8, 1942

2,295,097

UNITED STATES PATENT OFFICE 2,295,097

APPARATUS FOR REMOVING WATER FROM OIL-CIRCULATING SYSTEMS OF INTERNAL COMBUSTION ENGINES

Paul E. Waugh, Fort Wayne, Ind., assignor to Tokheim Oil Tank and Pump Company, Fort Wayne, Ind., a corporation of Indiana Application April 5, 1939, Serial No. 266,226

8 Claims. (Cl. 123—196)

This invention relates to a device for automatically removing water or any sludge which is electrically conductive, from the lubricant of the lubricating circulatory system of an internal combustion engine.

Among the objects of the present invention are to provide a device associated with the lubricating circulatory system of an internal combustion engine and designed automatically to filter and, or clarify and, or separate water or watery sludge from the circulating lubricant, collect the water or watery sludge and automatically discharge the same from time to time from the system without the possibility of discharging the lubricant itself; to provide in combination with the circulatory lubricating system of an internal combustion engine electrically operated means powered from the low voltage ignition system thereof and adapted automatically to remove from the circulating lubricant, all water and watery sludge which has been separated by stratification due to greater specific gravity of the water or watery sludge, and wherein a valved water discharge port is automatically opened when the level of the water reaches a predetermined height in the water collecting means and is maintained open for a length of time sufficient to discharge a relatively large proportion of such water and thereafter closing automatically in sufficient time to maintain constantly a body of water between the supernatant lubricant and the water discharge port, whereby to prevent the inadvertent discharge of lubricant along with the water; to provide in combination with the circulatory lubricating system of an internal combustion engine for an automobile, marine craft, air craft and the like, an attachment adapted to be inserted in series in the lubricating system therefor and operatively connected with the ignition system thereof and provided with spaced apart electrodes, a solenoid operated valve and switch mechanism, including an electrical relay operated by the low voltage ignition system for automatically opening and closing a water discharge valve from time to time and for maintaining said valve open a relatively long time whereby to discharge collected water or watery sludge separated from the lubricant of the system without discharging the lubricant itself; to provide, in combination with the foregoing device, means associated with the ignition system of the internal combustion engine, the arrangement being such that when the ignition switch mechanism is in operating position the water discharging mechanism is rendered inoperative and vice versa, whereby it will be impossible for an operator to discharge the water or watery sludge from the lubricating system during the circulation of the lubricant therethrough; to provide an attachment in the form of a combined filter, water and sludge collecting device and water discharge device for the lubricating system of an internal combustion engine wherein means is provided for quieting the circulating movement of the lubricant whereby to permit water or watery sludge automatically to separate out therefrom and to flow by gravity to a collecting sump, and to provide in association with the body of collected water and the supernatant lubricant automatic means for discharging the water or watery sludge but not the lubricant; to provide these and other objects of invention as will be apparent from a perusal of the following specification when taken in connection with the accompanying drawing:

Wherein Figure 1 is a sectional view of an oil filter and water collecting and discharging device for use in the oil line of an internal combustion engine, and, Wherein Figure 2 shows the device attached to the oil circulating system of an internal combustion engine.

Referring now to the drawing in detail, an internal combustion engine 1 is shown as provided with the usual type of oil circulating pump 2 attached to force lubricant through pipe 3, and the lubricant in turn is forced through the attachment forming, in combination with the motor, the subject matter of the present invention. From the device a clarified or filtered lubricant from which the water has been separated, is returned by means of the pipe 4 to the crankcase of the internal combustion engine. The attachment itself comprises a casing or bowl 5 of any desired material, having an opening in the side wall, into which is threaded a nipple 6 provided with a horizontally directed elbow discharge nozzle 7. This discharge nozzle is arranged to cause the lubricant to flow with a centrifugal action about the filter cartridge 8 located within the bowl. This cartridge is constructed and arranged for replacement. By removing the thumb nut 9, the cover 10 and spring 11 may be removed and the filter 8 may be replaced by a new one. Spot welded to the upper inner surface of the bowl 5 is a perforated baffle 12 which encircles the upper portion of the filter 8. The filter is held securely upon its adapter or seat 13 by reason of the spring 11. The upper and lower walls of the cartridge 8 are suitably perforated to permit the passage of oil from the space between the cartridge and the bowl 5 in an upward flowing direction through the perforated baffle 12, thence through the perforated top 14 of the cartridge, thence downwardly through the filter of the cartridge, thence through the perforated bottom 16 of the cartridge into a cup-shaped clarified lubricant receiving chamber 17 connecting with a discharge nipple 18, which in turn connects to the discharge pipe 4 for returning the clean lubricant to the crankcase of the motor. As the lubricant passes through the filtering material of the cartridge, all foreign matter removed therefrom will be detained within the filter element.

Means are provided for slowing down the flow of lubricant at the bottom portion of the bowl so as to give water entrained in the lubricant full opportunity to settle out by gravity, it being understood that the water is of greater specific gravity than the lubricant. To this end disposed about the lower portion of the bowl 5, are a plurality of vertically disposed baffles 19 suitably spaced about the circumference of the cartridge. These baffles tend to stop the centrifugal action of the liquid in this lower portion. Below these lower baffles a perforated baffle 20 is disposed, providing, in association with a casting 21 forming the bottom of the attachment, an oil, water and sludge accumulating reservoir. It is understood that when oil and entrained water circulate between the bowl 5 and the filter 8, the water by force of gravity, due to its heavier specific gravity, will settle down and enter the water collecting chamber 22. Means is associated with this water collecting chamber for automatically discharging from time to time a relatively large portion of such collected water and for preventing a discharge of the lubricant therewith. To this end, at one side of the sump or collecting chamber 22, the casing 21 is provided with a water discharge port that would normally be closed by the water discharge valve and this sump 21 is likewise provided with electrically operated means for opening the valve and maintaining it open a predetermined time interval. To this end, directly opposite the water discharge opening of the bottom of the lefthand portion of the sump 21, is provided a closure 23 for an opening 24. The closure 23 is suitably bolted to an upper or top wall of the casting 21. This closure is provided with a downwardly extending packing gland 25, through which is adapted to reciprocate a core 26 carrying at its bottom a closing valve 27. A spring 28 encircles the core and the packing gland and is adapted normally to close the valve 27 upon its seat. The core 26 is extended upwardly through an opening in the closure 23 and the upper portion of this core is provided with an insulated extension 29, carrying a switch contact 30 at its upper end. Solenoid 31 is disposed about core 26.

Disposed in the side wall of the sump casting 21, in vertically spaced apart relationship, are two electrodes 60 and 32, each comprising a central electrode surrounded by insulation and mounted in an opening in said side wall. In this way the central electrode is electrically insulated from the sump casting 21. The upper electrode is disposed considerably above the lower electrode 60, in fact, a sufficient distance is provided between these electrodes to assure a predetermined operation of the water discharge valve, as will be hereinafter described. Mounted upon the cover portion 23, by means of an upstanding bracket or support 33, is an electrical relay 34 adapted to actuate a switch 35 in the well known manner. In addition, a contact 36 is carried by a casing 37 which surrounds the electrical mechanism hereinbefore described. This casing 37 is provided with an opening 38 through which the electrical wiring passes for connection to a source of current, such as, for instance, a battery, and for connection to the low voltage ignition system of the internal combustion engine. The solenoid 31 is attached to the same bracket 33 which carries the relay 34. In the electrical wiring layout of this device the current that passes between the electrodes 60 and 32 and the casting 21 by means of the water or watery sludge accumulated in the bottom of the sump 22, flows through the relay coil 34 rather than through the solenoid 31. The relay then becomes energized and closes switch 35, which allows the full current of the battery 40 to act upon the solenoid 31. Switch 42 is adapted to make contact in two directions. The position of the switch 42 as shown in the figure, is such that it closes the circuit to the valve operating mechanism, but when the switch is swung to contact with the opposite point 43, it is adapted to close the primary ignition circuit which is represented by the two wires 44 and 45. By reason of this construction, when the circuit of the ignition is closed and the motor is running, the valve cannot be opened, but when the motor has been stopped by turning the switch 42 to its other position, the valve 27 may open if water is present in sufficient quantity to close the circuit with the upper electrode 32. By following the sketch it will be noted that current from the battery 40, when the switch 42 is in position shown, connects by means of wire 46 not only with the solenoid switch 35 but also with the relay 34, the other end of the coil of the relay connecting through wire 47 with the casting or ground 21. The wire 48, which makes contact with the switch 35, connects with solenoid 31. The other end of the coil of the solenoid 31 connects by means of wire 50 to the upper electrode 32 and also to wire 51 running to the other side of the battery. In addition, this wire 51 connects by means of wire 52 to the upper contact 36.

The lower contact 30, on the upper end of the core 26, is connected by means of wire 61 to the lower electrode 60, so that when the switch is in the position shown and water or watery sludge accumulates to the level of the upper electrode 32, the relay 34 will be operated by the battery 40 to close switch 35, whereupon the full strength of the battery will energize the solenoid 31 whereby to raise the core 26 to carry the valve 27 upwardly to full open position. At the same time contact 30 will be raised to touch contact 36, thereby making the circuit from the battery through the contact points 30 and 36, through the lower electrode and back to the other side of the battery, whereby at the same time the relay and solenoid will remain energized by the battery so that the valve will be maintained in open position against the tension of its closing spring 28. A major portion of the collected water present in the sump 22 will thus be discharged through the outlet controlled by valve 27 and this water will continue to be discharged until the water level passes out of contact with the lower electrode 60, at which point the circuit through the solenoid will be broken and the valve, through the action of spring 28, will be closed. It will thus be noted that by placing the lower electrode sufficiently below the upper electrode, there is maintained an arrangement for holding the discharge valve 27 open a sufficiently long time so that the valve will not be immediately re-opened until a relatively large amount of water has again collected in the sump 22. It will also be noted that by placing the lower electrode 60 sufficiently above the outlet port controlled by the valve 27, I always insure a body of water or watery sludge below the supernatant petroleum or oil so as to prevent the oil being discharged with the water. It is understood that lubricant will pass downwardly through the perforated plate 20 and will overlie the collected body of water or watery sludge.

Having thus described my invention, what I claim is:

1. An attachment for the oil circulating system of an internal combustion engine comprising a container within a container, the circumferential wall of the inner container being spaced from the circumferential wall of the outer container, the inner container being in communication through its top with the space between the containers, but closed at its bottom against communication with said space, oil filtering material in the inner container, means providing a water collecting chamber beneath said containers and in communication with the space between said containers, an inlet adapted to be connected to the oil circulating system and extending through the outer container into the space between the containers above the water collecting chamber, and an outlet conduit adapted to be connected to the oil circulating system extending through the containers into the inner container.

2. An attachment for the oil circulating system of an internal combustion engine comprising a container within a container, the circumferential wall of the inner container being spaced from the circumferential wall of the outer container to form a water separating chamber, the inner container being in communication through its top with said chamber but closed at its bottom, oil filtering material in the inner container, means providing a water collecting chamber beneath said containers and in communication with said separating chamber, an inlet adapted to be connected to the oil circulating system and extending through the outer container into the separating chamber above the water collecting chamber, said water collecting chamber having a discharge outlet, a valve controlling said outlet, and electrical control means adapted to be connected to the ignition control switch of the internal combustion engine for controlling said valve, said control means including a control device responsive to the level of accumulated water in the collecting chamber, and connections for rendering said control means ineffective when the ignition switch is closed to operate the internal combustion engine.

3. An attachment for the oil circulating system of an internal combustion engine comprising a bowl adapted to receive and hold a cartridge containing filtering material, a container inclosing said bowl and cartridge and having its circumferential wall spaced from the circumferential walls of the bowl and cartridge to form an oil circulating and water separating chamber, a water collecting sump beneath said container and in communication with said chamber, said cartridge having perforate top and bottom walls to permit oil in said chamber to flow into the cartridge and to permit the flow of filtered oil from the cartridge into the bowl, an inlet pipe adapted to be connected to said oil circulating system and extending into communication with said chamber, and an outlet pipe adapted to be connected to said oil circulating system and extending through the container into the bowl.

4. An attachment for the oil circulating system of an internal combustion engine comprising a bowl adapted to receive and hold a cartridge containing filtering material, a container inclosing said bowl and cartridge and having its circumferential wall spaced from the circumferential walls of the bowl and cartridge to form an oil circulating and water separating chamber, a water collecting sump beneath said container and in communication with said chamber, said cartridge having perforate top and bottom walls to permit oil in said chamber to flow into the cartridge and to permit the flow of filtered oil from the cartridge into the bowl, an inlet pipe adapted to be connected to said oil circulating system and extending into communication with said chamber, an outlet pipe adapted to be connected to said oil circulating system and extending through the container into the bowl, and a perforated partition forming the bottom of the container and separating said container from the sump.

5. An attachment for the oil circulating system of an internal combustion engine comprising an assembled bowl and sump, a shallow basin in said bowl for supporting a cartridge having perforate top and bottom walls and containing filtering material, the bowl having its circumferential wall spaced from the circumferential walls of the basin and the cartridge to form a separating chamber, baffles in the bottommost portion of the chamber between the bowl and the cartridge and the basin, an oil supply inlet into the chamber above said baffles and below the top of the cartridge, an oil discharge outlet from the basin, said sump having a water discharge outlet, a spring pressed valve normally closing said outlet, said valve having an upstanding stem, a solenoid into which the stem of the valve projects, a contact carried by said stem and insulated therefrom, a pair of electrodes mounted in said sump in vertically spaced relation, a contact positioned for engagement by the stem carried contact, a relay, a switch operated by the relay and in circuit with the solenoid, a circuit for said relay and in which said electrodes are connected in parallel, said contacts being in the parallel branch with the lower electrode.

6. An attachment for the oil circulating system of an internal combustion engine comprising an assembled bowl and sump, a basin mounted in the lower portion of the bowl and adapted to receive the lower end of a cartridge containing filtering material, the space between the bowl and the cartridge when received in said basin forming a chamber of sufficient vertical extent to separate water and watery sludge by gravity from the oil as the oil rises in the chamber, means providing an oil supply inlet into said chamber near the bottom thereof, the upper portion of said chamber being communicatively connected to the top of said cartridge when said cartridge is received in said basin, means forming a discharge conduit extending into the basin to return water-free, filtered oil to the system, said sump being disposed below said bowl and basin and in communication with said bowl to receive the separated water and watery sludge, means between said bowl and sump for preventing the agitation of water or sludge in said sump by oil circulating in said chamber, a discharge port in the bottom of said sump, a valve normally closing said discharge port, and means actuated by the water and watery sludge as the level thereof in said sump varies for operating said valve.

7. A water discharging and oil filtering device for an internal combustion engine having a low voltage ignition system and an oil circulating system, said water discharging and oil filtering device comprising a water separator bowl having an inlet adapted to be connected to the oil circulating system, a container in said bowl and having oil filtering means therein, said container being positioned to receive oil from the upper portion of the bowl, water collecting means disposed beneath and in communication with the bottom of the bowl for receiving both oil and water from the bowl with the oil overlying the collected water, a pair of electrodes spaced vertically in said collecting means for engagement by the collected water, a normally closed valve controlling the discharge of the collected water from said collecting means, a solenoid for opening said valve, an electric supply line adapted to be connected to the low voltage source of the ignition system, a relay, a circuit connected to said supply line and including said relay and the upper electrode in series, a switch operated by said relay for connecting said solenoid across said supply line, and a switch operated by said solenoid when connected across said supply line for connecting the lower electrode in the relay circuit in shunt to the upper electrode.

8. In a device of the class described, an open top sump casing, a perforated partition closing said top, an inner, closed bottom bowl mounted on the sump above and spaced from said partition, an outer cylinder mounted on said sump and surrounding said bowl, a cartridge detachably mounted on said inner bowl, said cartridge having upper and lower perforate walls and a circumferential imperforate side wall, the side walls of the inner bowl and cartridge being spaced from the cylinder to form a water separating chamber, filter means in said cartridge, an oil discharge conduit passing through the wall of the cylinder into the inner bowl, an oil inlet conduit extending into said chamber below the top of the cartridge, a perforate circumferential baffle in the upper portion of said chamber between the cylinder and cartridge, and a cover for said cylinder spaced from the upper surface of said cartridge.

PAUL E. WAUGH.